United States Patent [19]

Rider

[11] 4,345,624

[45] Aug. 24, 1982

[54] BLOW-OUT GUARD FOR HIGH-PRESSURE HOSES

[75] Inventor: Thomas F. Rider, Manitowoc, Wis.

[73] Assignee: Gould Inc., Rolling Meadows, Ill.

[21] Appl. No.: 317,080

[22] Filed: Nov. 2, 1981

Related U.S. Application Data

[63] Continuation of Ser. No. 121,904, Feb. 15, 1980, abandoned.

[51] Int. Cl.³ ............................................. F16I 11/00
[52] U.S. Cl. .................................. 138/110; 138/125; 138/127; 138/172
[58] Field of Search ............. 138/103, 104, 110, 124, 138/125, 126, 130, 172, 178, 127

[56] References Cited

U.S. PATENT DOCUMENTS

| | | | |
|---|---|---|---|
| 762,954 | 6/1904 | Smith | 138/124 |
| 1,622,397 | 3/1927 | Schlaich | 138/110 |
| 1,786,585 | 12/1930 | Walker | 138/110 |
| 2,836,200 | 5/1958 | Webbe | 138/110 |
| 2,864,378 | 12/1958 | Schneller et al. | 138/110 |
| 3,073,353 | 1/1963 | Rittenhouse | 138/110 |
| 3,538,238 | 11/1970 | Delacour et al. | 138/110 |
| 3,831,635 | 8/1974 | Burton | 138/110 |
| 3,857,415 | 12/1974 | Morin | 138/110 |
| 3,862,878 | 1/1975 | Azuma | 138/110 |
| 3,920,050 | 11/1975 | Nichol et al. | 138/110 |
| 4,001,918 | 1/1977 | Moore | 138/110 |
| 4,009,733 | 3/1977 | Schnabel | 138/110 |
| 4,014,370 | 3/1977 | McNulty | 138/141 |
| 4,153,079 | 5/1979 | Ambrose | 138/104 |
| 4,169,477 | 10/1979 | Bokors | 29/477 |
| 4,259,555 | 3/1981 | Tanaka et al. | 138/104 |

FOREIGN PATENT DOCUMENTS 681283  3/1978  U.S.S.R. ............................. 138/110

Primary Examiner—John W. Shepperd
Attorney, Agent, or Firm—Russell E. Baumann

[57] ABSTRACT

A blow-out guard is disclosed for use with high-pressure conduits. A double layer, wire sheath is fixedly attached over the end portion of the hose. If the hose should burst, the medium escapes through the interstices of the sheath and is thereby reduced to a dispersed effluent or a fine spray, thus protecting the operator.

9 Claims, 4 Drawing Figures

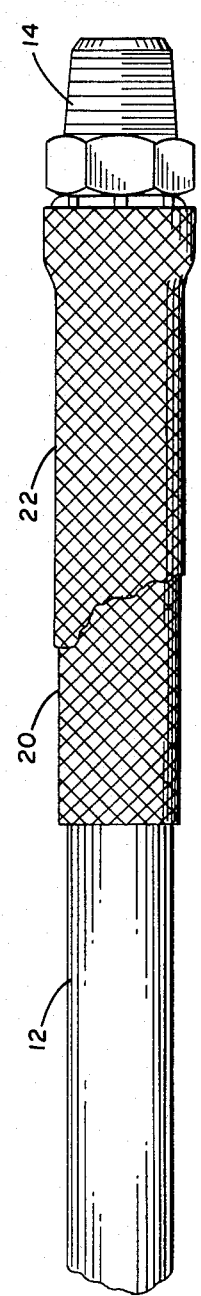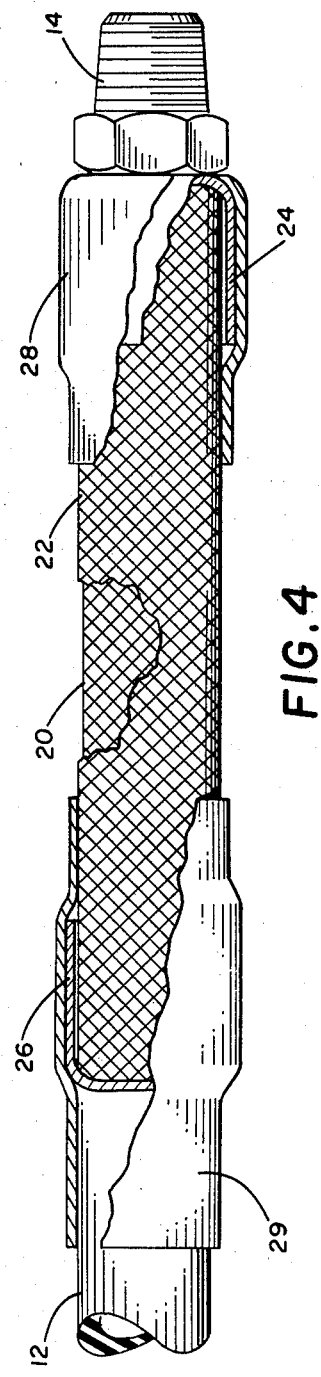

BLOW-OUT GUARD FOR HIGH-PRESSURE HOSES

This is a continuation, of application Ser. No. 121,904, filed Feb. 15, 1980 now abandoned.

BACKGROUND OF THE INVENTION

The present invention relates to safety devices for high-pressure hoses of the type that transfer matter through flexible conduits and is more particularly directed to a protection device to prevent injury to an operator or nearby personnel when a high-pressure hose bursts.

It is known in the art to transfer fluids under high pressure through flexible hoses. The pressure on the inside of such hoses may exceed thousands of pounds per square inch. While hoses presently used in such applications are quite good, they present a possible safety hazard to the operator or nearby personnel.

To avoid such possible injury, the prior art teaches the use of a protective outer sleeve open at one end that has an inner diameter greater than the outer diameter of the high-pressure hose. The possibility still exists in this type of protection device to pierce the blow-out guard and subsequently cause injury. Such devices also require the guard length to be several feet long to ensure that the escaping effluents will not injure the operator. If personnel are standing at the opening of the guard, they may still be injured by the escaping effluents.

OBJECTS OF THE PRESENT INVENTION

An object of the present invention is to provide a blow-out guard for use on high-pressure hoses which will protect the operator and nearby personnel if the high-pressure hose bursts.

Another object of the present invention is to provide such a blow-out guard and still have the high-pressure hose flexible.

The above objects are given by way of example. Thus other desirable objectives and advantages achieved by this invention may occur to those skilled in the art. The scope of the invention is to be limited only by the appended claims.

BRIEF SUMMARY OF THE INVENTION

The above objects and other advantages are achieved by the present invention. A device is provided for use with high-pressure hoses that protects the operator and nearby personnel in case the hose bursts. The present invention provides a blow-out guard which does not contain the escaping effluents but disperses them and renders them harmless. The device comprises a plurality of fibers, filaments or wires that have been braided, spiral wrapped or knitted into a tubular sleeve or sheath of one or more layers and placed over the high-pressure conduit. One end of the device is fixedly attached to the coupling shell of the conduit with a ferrule and the other end is covered with a second ferrule to protect the operator from loose ends of the intermeshed filament; the sleeve or sheath fitting loosely around the conduit. If the conduit bursts, the fluid, upon striking the guard, will be broken down into small streams as it passes through the interstices of the sheath. As the fluid exits the sheath, it is rendered harmless since the fluid is reduced to a dispersed effluent or a fine spray.

BRIEF DESCRIPTION OF THE DRAWINGS

FIG. 3 is an axial cross section showing a hose assembly with the partial assembly of the guard of the invention; and FIG. 4 is a view similar to FIG. 1 showing an alternative form of the invention.

DESCRIPTION OF THE PREFERRED EMBODIMENTS

Figure 1:
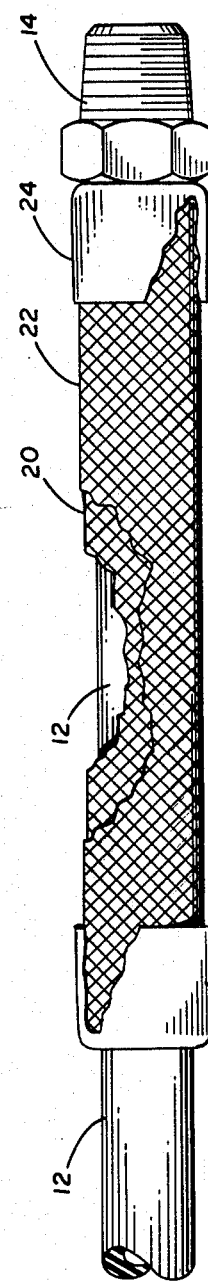
FIG. 1 is an axial cross section showing a hose assembly including the guard of the invention.

A description of the invention follows, referring to the drawings in which like reference numerals denote like elements of structure in each of the several Figures.

Figure 2:
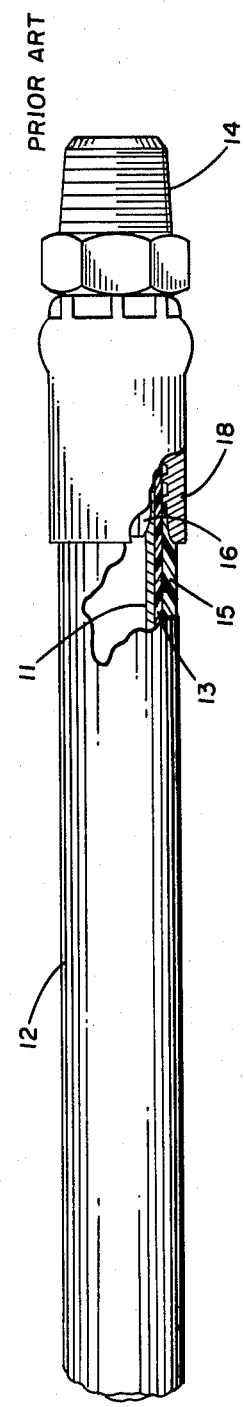
FIG. 2 is an axial cross section showing a hose assembly without the guard of the invention.

In accordance with the invention and as proffered in the drawings, a hose assembly 10 is provided that includes the blow-out guard of the invention. The hose portion 12 is a high-pressure conduit which can be made out of a polymeric material, steel tubing, hydraulic hose or transport hose. An example of such a conduit, shown in FIG. 2, preferably consists of an inner core 11 with a reinforcing layer or layers 13 around it and an outer covering 15. A coupling 14 is fixedly attached to hose portion 12 in the known fashion. The coupling includes a stem 16 and a ferrule 18 which sandwich and grip the hose 12. The coupling end typically defines an input or a discharge end of the hose 12.

A first intermeshed sheath guard 20 circumferentially surrounds hose 12 such that it fits loosely over the hose. One end of sheath 20 is positioned directly over the coupling 14. A second sheath 22 circumferentially surrounds the first sheath 20 wherein the lengths of the two sheaths are preferably equal. Sheaths 20 and 22 are loosely braided, spiral wrapped or knitted such that interstices are left in the sleeve. It has been determined that the interstitial spacing can vary from a minimum of 0.5% to a maximum of 20% with a preferable spacing between 1% to 8%. Since hose failures typically occur at the ends of the hose near the coupling, the length of the sheaths 20 and 22 need only cover a portion of the end of the hose. The length of the sheaths, however, can equal the length of the hose 12, but preferably only cover the area adjacent the hose ends. The sheaths 20 and 22 are preferably made from wire but can also be made from fibers or filaments. In accordance with this invention, the sheaths can be braided, spiral wrapped or knitted into a tubular form leaving interstitial openings with the inner diameter of the sheath greater than the outer diameter of hose 12 such that the sheath can be slipped over the hose 12 prior to attaching hose coupling 14. Additionally, sheaths 20 and 22 are preferably flexible in order to not restrict movement of the hose.

As shown in FIG. 1, a ferrule 24 is attached at one end of the sheath gripping it to the coupling 14. Another ferrule 26 may be attached at the other end of the sheath in order to protect the operator from the end portions of the wire of the sheath. The length of the two ferrules 24 and 26 are such that a major portion of the sheath remains exposed. The ferrules 24 and 26 are preferably made from aluminum or steel although copper, brass and other standard metals could equally well be used.

If the hose 12 should burst along a portion covered by the guard 10, the guard does not try and retain the escaping effluents but instead disperses them and renders them harmless. As the escaping fluid, for example, passes through the interstices of the sheath, it is broken down into a plurality of paths of flow or streams. The escaping medium is thereby reduced to a dispersed effluent or a fine spray. The pressure within the hose will thus be reduced immediately since the effluents will continue to escape. The sheath also will retain any solid particles from the bursting hose.

In another embodiment of the presention invention, the second sheath 22 would not be required for use in a low-pressure conduit if it is anticipated that the single sheath would provide sufficient strength to prevent rupture of the sheath when a conduit failure occurs.

In yet another embodiment of the present invention, as shown in FIG. 4, shrinkable tubing 28 and 29 can be placed over ferrules 24 and 26 still leaving a major portion of the sheath exposed in order to better secure the ferrules to the hose 12. The type of tubing contemplated is a heat-shrinkable tubing that is known in the art.

This invention has been described with reference to preferred embodiments. Obvious modifications and alterations will occur to others upon reading and understanding of this specification. The intention is to include all such modifications and alterations insofar as they come within the scope of the appended claims or the equivalent thereof.

I claim:

1. A blow-out guard assembly for use with a high-pressure conduit carrying fluids of the type having at least one coupling end, said assembly comprising:

at least a one layer sheath loosely circumferentially surrounding said high-pressure conduit and extending axially from said coupling end at least a finite length along said conduit, said sheath being a non-load bearing member during normal fluid flow loading of said conduit and having a plurality of interstices therethrough, said interstitial spacing being 20% at maximum; and a ferrule covering and fixedly attaching one end of said sheath to said coupling end and leaving most of the sheath uncovered such that escaping effluents from said high-pressure conduit during blow out would pass through said interstices of said sheath causing the effluents to disperse and become harmless.

2. A blow-out guard assembly of claim 1 further comprising a second ferrule covering the other end of the sheath, still leaving most of the sheath uncovered.

3. The blow-out guard assembly of claim 2 wherein the two ferrules are covered with a shrinkable tubing to better secure the sheath to said high-pressure conduit but still leaving most of the sheath uncovered.

4. The blow-out guard assembly of claim 1 further comprising a second at least one layer sheath having interstices therethrough and circumferentially covering said first-mentioned sheath to form smaller interstices and to strengthen the guard assembly.

5. The blow-out guard assembly of claim 4 wherein said first-mentioned and second sheaths are made from wire.

6. The blow-out guard assembly of claim 4 wherein said first-mentioned and second sheaths are made from fibers.

7. The blow-out guard assembly of claim 4 wherein said first-mentioned and second sheaths are made from filaments.

8. The blow-out guard assembly of claim 4 wherein said first-mentioned and second sheaths are loosely braided.

9. The blow-out guard assembly of claim 4 wherein said first-mentioned and second sheaths are knitted.

* * * * *